United States Patent [19]

Levenstein

[11] Patent Number: 5,069,587
[45] Date of Patent: Dec. 3, 1991

[54] SECURING NUT APPARATUS

[75] Inventor: Victor M. Levenstein, Reynoldsburg, Ohio

[73] Assignee: Dresser Industries, Inc., Dallas, Tex.

[21] Appl. No.: 537,179

[22] Filed: Jun. 13, 1990

[51] Int. Cl.[5] .................. F16B 37/08; B21D 39/00
[52] U.S. Cl. .................................. 411/432; 411/917; 403/16; 29/456
[58] Field of Search ............ 411/432, 433, 237, 916, 411/917; 403/11, 16, 259, 261, 370; 29/456

[56] References Cited

U.S. PATENT DOCUMENTS

| | | |
|---|---|---|
| 2,677,984 | 5/1954 | Juy ................................ 411/432 |
| 3,618,994 | 11/1971 | Gepfert . |
| 4,010,669 | 3/1977 | Kloren . |
| 4,416,575 | 11/1983 | McCarthy . |
| 4,622,730 | 11/1986 | Steinbock . |
| 4,660,687 | 4/1987 | Williams et al. ............... 411/432 |
| 4,810,919 | 3/1989 | Ponce et al. . |
| 4,927,305 | 5/1990 | Peterson, Jr. ................. 411/432 |

Primary Examiner—Neill R. Wilson
Attorney, Agent, or Firm—Joseph T. Yao

[57] ABSTRACT

A securing nut apparatus for detachably connecting and clamping a machine component onto a shaft includes a nut hub body having a threaded main bore and a nut outer ring. The nut outer ring cooperates with the nut hub body threadably engaged to the shaft to provide a uniform clamping force to the machine component. A plurality of screws couple the nut outer ring with the nut hub body. A threaded engagement between the screws and threaded openings of the nut hub body forces the nut outer ring therebetween into a high uniform clamping force against the machine component.

8 Claims, 1 Drawing Sheet

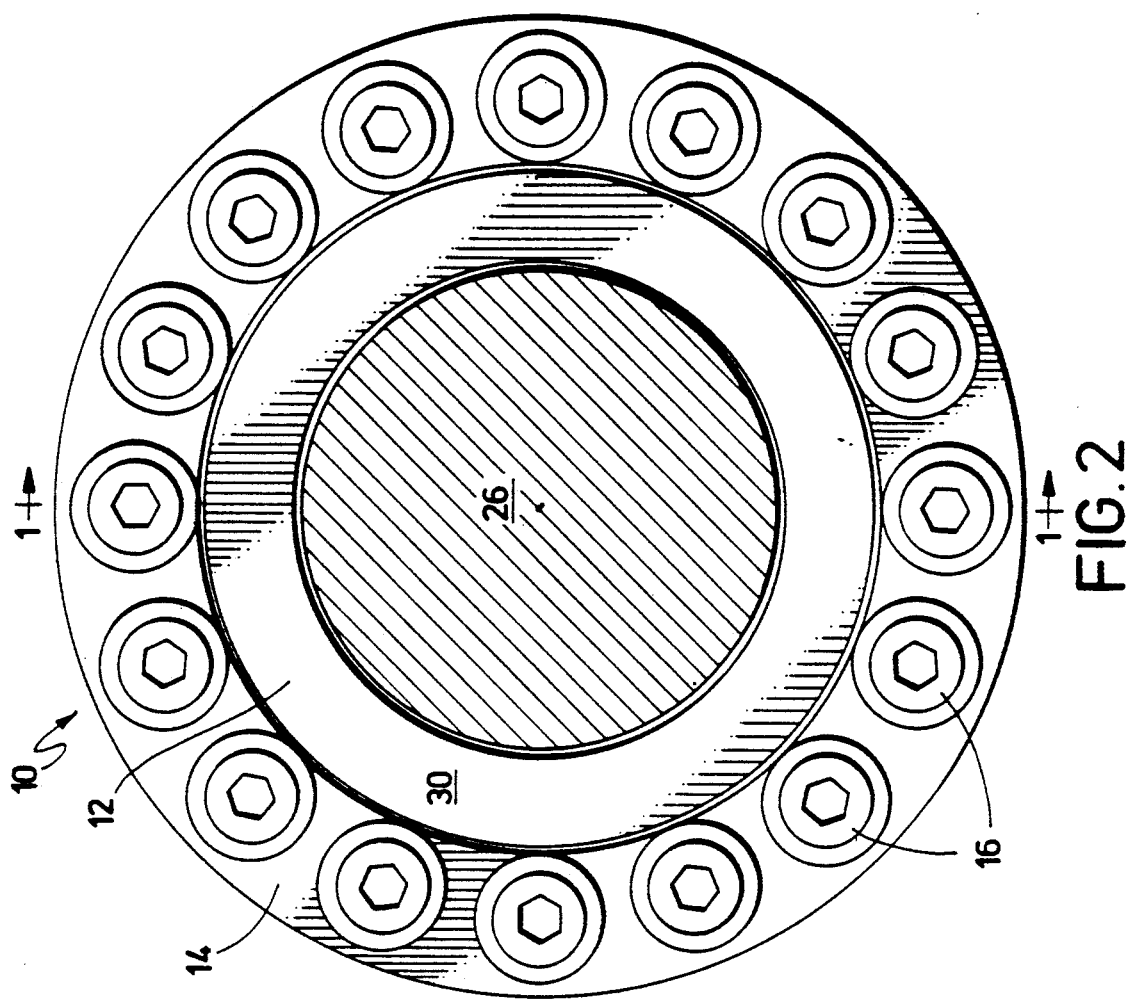
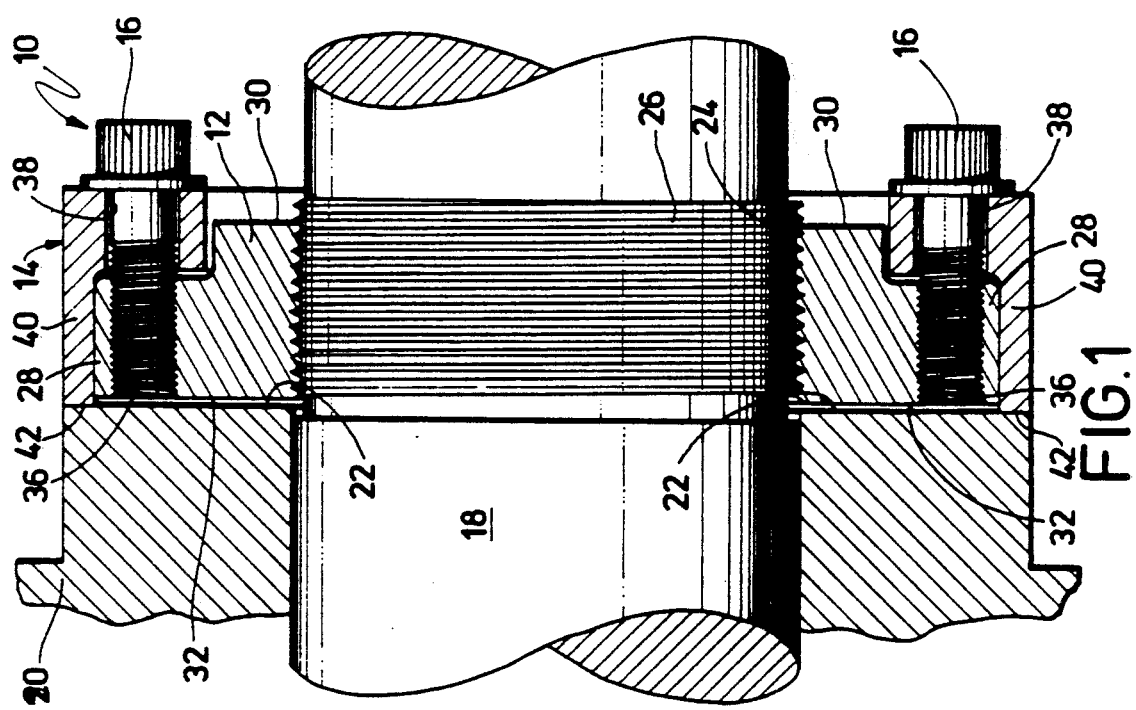

SECURING NUT APPARATUS

BACKGROUND OF THE INVENTION

This invention relates to an apparatus for detachably clamping a machine component onto a shaft, and more particularly to a nut apparatus for a shaft having a threaded portion where a high clamping force on a machine component is necessary.

Heavy duty mining equipment utilize machine components, such as large rotary cutter drums to break up earth formations, i.e., rocky soil, coal and other mineral deposits. These machine components are rotatably mounted on large diameter shafts and secured to the shaft by a large diameter nut threaded onto a threaded shank portion of the shaft. These machine components are subjected to tremendous loads and vibrations necessitating a high clamping force between the affected machine components and securing nut to prevent inadvertent loosening of the nut from the shaft. This clamping force may be as high as 1,000,000 lbf which would require a torque on an 8 inch diameter nut to equal 100,000 lb-ft.

It is old in the art to use a wrench to apply the requisite torque to a conventional nut to couple a part to a shaft. But often-times it is impractical to use torque wrenches for large diameter nuts because of limited space availability to reach the nut or because the work site does not provide proper environment to effect the requisite torque on the nut with a special force multiplying torque wrench. Additionally, conventional torquing devices are limited to applying torque to a nut of up to 1½ inch diameter. Generally, the torque necessary to achieve high clamping force for an 8 inch diameter nut will exceed the limits of practicality.

The prior art has provided hydraulic lock nuts or tensioning nuts wherein a pressure generating member is attached to the nut for the purpose of actuating a pressure pad to effect the necessary clamping force. These hydraulic lock nuts are prohibitively expensive for large diameter nuts, inconvenient to use in certain environments, and require additional equipment.

An alternative solution to this problem is a mechanical locking nut shown by Gepfert U.S. Pat. No. 3,618,994 and Steinbock U.S. Pat. No. 4,622,730. The Gepfert patent discloses an arbor nut having a body portion including a threaded main bore receivable on a threaded shank of an arbor, a first and second side face, and a plurality of threaded bores extending from the first to the second face. The arbor nut is advanced over the threaded shank portion of the arbor until it abuts against the tooling. Pads are recessed into the plurality of threaded bores and a plurality of jacking screws, each having a spherical bearing surface adapted to contact a complementary spherical bearing seat of the swivel pad, are disposed within the threaded bores. As the jacking screws are rotated into the threaded bores, the spherical bearing surface seats the pads against the tooling to impart a high clamping force to the tooling to firmly lock the nut in place. However, the Gepfert arbor nut does not provide a uniform clamping force, but instead, a compression-type clamping force that is concentrated at the contact point between the pad and the tooling. Further, the Gepfert invention requires: (1) special pads that are awkward to insert and may be misplaced in the threaded bores; and (2) expensive specialty screws with spherical surface ends to seat onto the special pads.

The Steinbock patent discloses a fastening apparatus that includes a flange ring adjacent an element to be fastened, a collar having a plurality of bored and tapped holes, and a plurality of jack bolts threaded into each tapped hole. The collar is rotated on a threaded shank portion of a structure and may contact or form a small gap between the collar and the flange which abuts the element to be secured. Jack bolts are then rotated until the end portions extend from the collar to contact the flange to provide the necessary clamping force to hold the machine element in place. By utilizing the jack bolts to act in a compression force against the flange, the Steinbock apparatus can deform the flange and possibly the machine element, and also fail to provide a uniform clamping force.

Various other types of fastening arrangements are shown in U.S. Pat. Nos. 4,010,669 (Kloren) and 4,416,575 (McCarthy).

SUMMARY OF THE INVENTION

It is an object of this invention to provide high uniform clamping force to a machine component mounted on a shaft through a mechanical securing nut apparatus.

It is a feature of the invention to include a nut hub body which threadably engages a shaft and a nut outer ring which cooperates with the nut hub body to provide a uniform clamping force to the machine component.

It is an additional feature of the invention to have a plurality of screws work in tension with threaded holes of the nut hub body and force the nut outer ring into a high uniform clamping force against the machine component.

It is an advantage of this invention that when a securing nut apparatus is subjected to variable loads and vibration, the nut apparatus remains securely threaded to the shaft and provides high uniform clamping force to the machine component.

A securing nut apparatus in accordance with the present invention includes a nut hub body having a threaded main bore adapted to be received over the threaded shank of a shaft and a flange portion having a plurality of threaded holes. The nut apparatus also includes a nut outer ring having a plurality of bores in alignment with the threaded holes of the nut hub body and an annular sidewall overlapping the flange portion of the nut hub body. A plurality of cap screws are disposed within the bores of the nut outer ring and the threaded holes of the nut hub body. In accordance with an important aspect of the invention, the tightening of the screws into the threaded holes of the nut hub body forces the annular sidewall of the nut outer ring therebetween, to apply a high uniform clamping force against the machine component mounted on the shaft. The fact that the force is a result of tension between the screws and threaded holes, permits the use of standard screws in this invention.

Other objects, features and advantages of the invention will be apparent in the following description and claims in which the invention is described, together with details to enable persons skilled in the art to practice the invention, all in connection with the best mode presently contemplated for the invention.

BRIEF DESCRIPTION OF THE DRAWINGS

Drawings accompanying the disclosure and the various views thereof may be briefly described as:

FIG. 1 is a lengthwise section of a securing nut apparatus; and

FIG. 2 is an end view of the securing nut apparatus.

DETAILED DESCRIPTION OF THE INVENTION

The preferred embodiment of the present invention is illustrated by way of example in FIGS. 1 and 2. With specific reference to FIG. 1, a securing nut apparatus 10 includes a nut hub body 12, a nut outer ring 14 and a plurality of screws 16. On shaft 18 is mounted a machine component 20 having an open face 22 that is adjoined by securing nut apparatus 10.

As shown in FIG. 1, the nut hub body 12 has a threaded main bore 24, preferably centrally located, adapted to engage a threaded shank portion 26 of the shaft 18. The nut hub body 12 is cylindrical in shape with a radially extending flange portion 28 having a first side face 30 and a second side face 32 adjacent to the open face 22 of machine component 20. The flange portion 28 has a plurality of threaded holes 36, equally spaced from each other and circumferentially spaced from the main bore 24.

The nut outer ring 14 has a plurality of bores 38, preferably in equal number to and in alignment with the threaded holes 36 of the nut hub body 12. The nut outer ring 14 also includes an extending annular side wall 40 that overlaps the periphery of the flange portion 28 of the nut hub body 12. This annular side wall 40 has an end face 42 normal to the axis of bores 38 and in abutting engagement with the face 22 of machine component 20. As seen in FIG. 1, the side wall 40 has a length greater than the thickness of the flange portion 28, so that end face 42 extends beyond the plane of second side face 32 of nut hub body 12.

As shown in FIG. 2, the plurality of screws 16 are preferably standard socket head cap screws engageable by a standard torque wrench.

The application of the securing nut apparatus 10 of this invention will now be described with reference to FIG. 1. The nut hub body 12 is received on the threaded shank portion 26 of shaft 18, and is rotated onto threads of shank 26 until face 32 of hub 12 is tight against the face 22 of the machine component 20. The nut outer ring 14 is then placed over the nut hub body 12 so that the side wall 40 overlaps flange portion 28. Each socket head cap screw 16 is then received through bore 38 of nut outer ring 14 and threadably engaged to threaded hole 36 of the nut hub body 12. Each screw 16 is then tightened, preferably by a torque wrench, into threaded hole 36. The screws 16 act in tension with the threaded holes 36 to pull the nut outer ring 14 toward the nut hub body 12 and force the end face 42 of the annular side wall 40 into an abutting engagement with the face 22 of the machine component 20.

In certain applications, such as securing a large cutter drum onto an 8" diameter shaft of a heavy duty mining machine, the clamping force necessary to prevent an 8" diameter nut from unloosening from the shaft is approximately 1,000,000 lbf. In this specific application a torque of 100,000 lb-fts must be applied to the 8" diameter nut to create such a high clamping force. By utilizing the securing nut apparatus 10 with sixteen 1" diameter Grade 8 socket head cap screws, the user need only supply 1,000 lb-ft. torque on the bolt head of each of the 16 screws to create a uniform clamping force of approximately 1,000,000 lbf between the securing nut apparatus 10 and machine component 20. Such a clamping force from a conventional locking nut is impractical without utilizing special hydraulically powered devices.

It is to be understood that the terminology as employed in the description and claims incorporated herein is used by way of description and not by way of limitation, to facilitate understanding of the structure, function and operation of the combination of elements which constitute the present invention. Moreover, while the foregoing description and drawings illustrate in detail one successful working embodiment of the invention, to those skilled in the art to which the present invention relates, the present disclosure will suggest many modifications in the construction, as well as widely differing embodiments and applications without thereby departing from the spirit and scope of the invention. The present invention, therefore, is intended to be limited only by the scope of the appended claims and applicable prior art.

What is claimed is:

1. A securing nut apparatus for detachably clamping a member on a shaft comprising:
   A. a nut hub body having a threaded main bore detachably engageable to a threaded portion of the shaft, and a flange portion having a plurality of threaded holes in a spaced apart relationship;
   B. a nut outer ring having a plurality of bores in alignment with said threaded holes of said nut hub body and an annular sidewall overlapping said flange portion of said nut hub body, said annular sidewall having an end face; and
   C. a plurality of screws receivable through said bores of said nut outer ring and threadedly engageable with said holes of said nut hub body so that said end face of said annular side wall abuts the member and applies a clamping force to the member onto the shaft.

2. The securing nut apparatus as set forth in claim 1 wherein said flange portion of said nut hub body further comprises a first and second face, and said threaded holes extend from said first face to said second face.

3. The securing nut apparatus as set forth in claim 2 wherein said threaded holes are circumferentially spaced from said main bore.

4. The securing nut apparatus as set forth in claim 2 wherein said threaded holes are equally spaced about the circumference of said hub body.

5. The securing nut apparatus as set forth in claim 2 wherein said annular sidewall has a length greater than the thickness of said flange portion of said. nut hub body, so that said end face of said sidewall extends beyond the plane of said second face adjacent the member to be clamped.

6. The securing nut apparatus as set forth in claim 1 wherein said screws are standard cap screws.

7. A securing nut apparatus for detachably clamping a member on a shaft comprising:
   A. a nut hub body having a centrally located threaded main bore detachably engageable to a threaded portion of the shaft, a flange portion having a plurality of threaded holes in an equally spaced apart relationship and circumferentially spaced from said main bore, and a first face adjacent the member on the shaft;
   B. a nut outer ring having a plurality of bores in alignment with said threaded holes of said nut hub body and an annular side wall overlapping said flange portion of said nut body, said annular side wall having an end face and a length greater than the thickness of said flange portion, so that said end face extends beyond the plane of said first face of said nut hub body; and C. an plurality of screws receivable through said bores of said nut outer ring and threadably engageable with said holes of said nut hub body so that said end face of said annular side wall abuts the member and applies a high clamping force on the member on the shaft.

8. A method of detachably clamping a member on a shaft, which comprises:
  A. providing a nut hub body having a threaded main bore and a flange portion having a plurality of threaded holes in a spaced apart relationship;
  B. coupling said main bore of said nut hub body to a threaded portion of the shaft so that said hub body is adjacent the member to be clamped;
  C. providing a nut outer ring having a plurality of bores in alignment with said threaded holes of said nut hub body and an annular side wall including an end face;
  D. placing said nut outer ring over said nut hub body so that said bores are in alignment with said threaded hole of said nut hub body, and said end face of said annular side wall abuts the member;
  E. providing a plurality of standard cap screws;
  F. inserting said screws through said bores of said nut outer ring and threadably engaging with said holes of said nut hub body; and
  G. tightening each said screw into said threaded holes of said nut hub body so that said screws force the end face of said annular side wall of said nut outer ring to create a high clamping force on the member.

* * * * *